Figure 1:
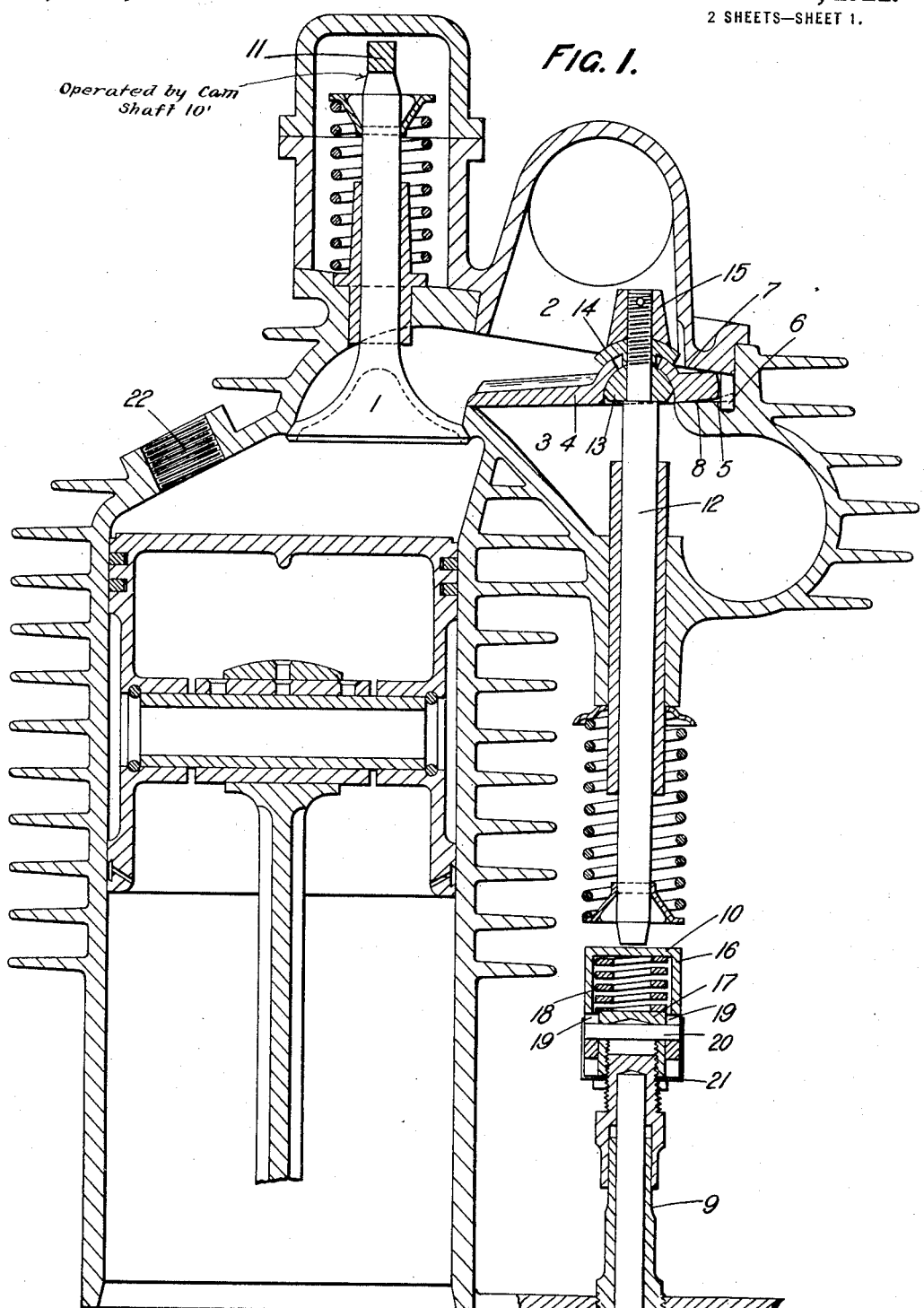

W. A. JAMES.
VALVE MECHANISM FOR INTERNAL COMBUSTION ENGINES.
APPLICATION FILED APR. 16, 1921.

1,397,585.

Patented Nov. 22, 1921.

2 SHEETS—SHEET 1.

INVENTOR
William A. James.

Atty.

W. A. JAMES.
VALVE MECHANISM FOR INTERNAL COMBUSTION ENGINES.
APPLICATION FILED APR. 16, 1921.
1,397,585.
Patented Nov. 22, 1921.
2 SHEETS—SHEET 2.
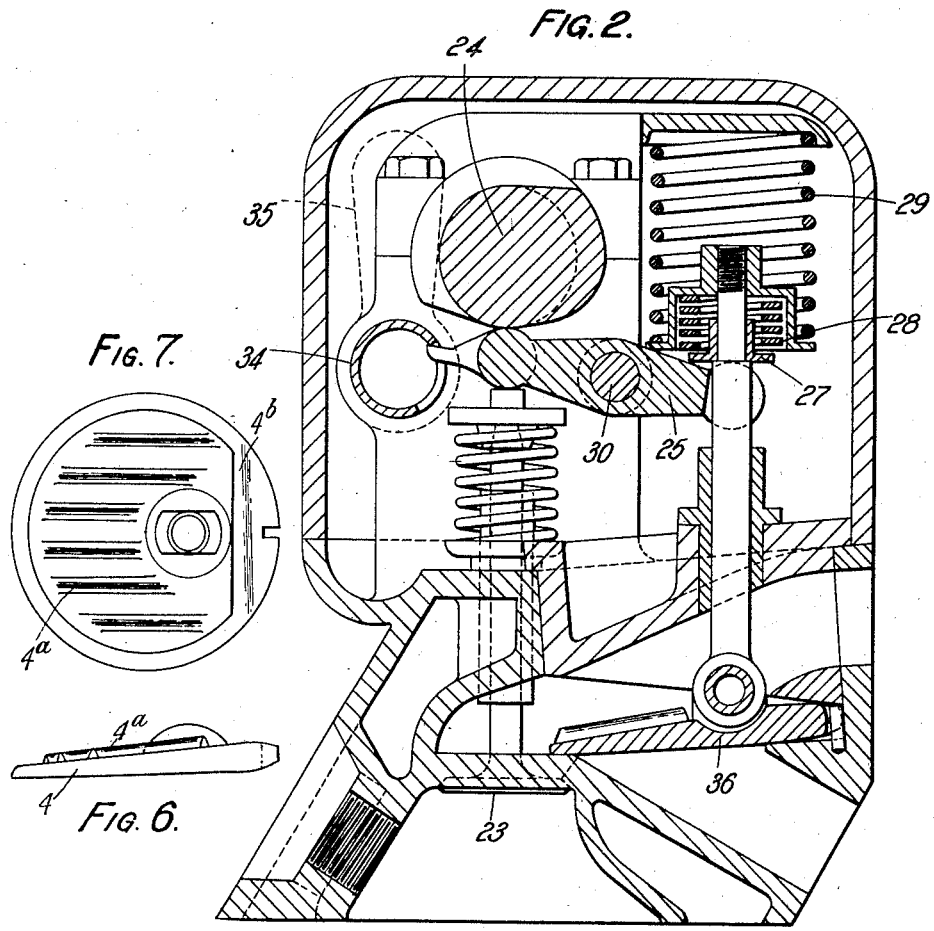
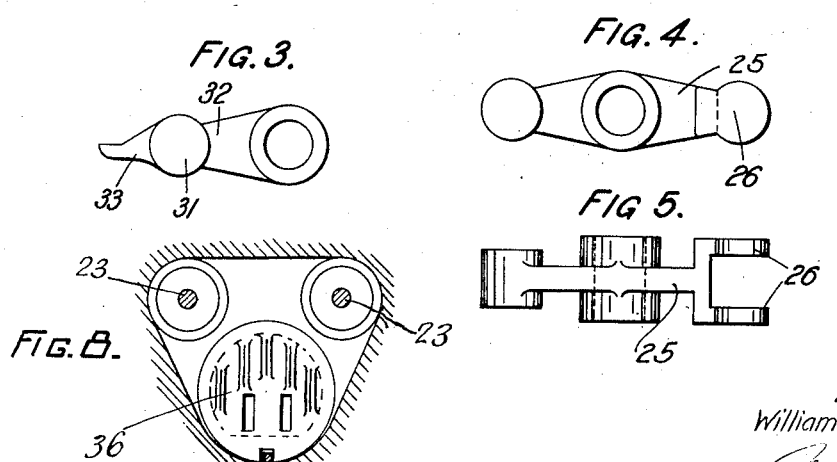
INVENTOR
William A. James.

UNITED STATES PATENT OFFICE.

WILLIAM A. JAMES, OF LONDON, ENGLAND.

VALVE MECHANISM FOR INTERNAL-COMBUSTION ENGINES.

1,397,585.            Specification of Letters Patent.        Patented Nov. 22, 1921.

Application filed April 16, 1921. Serial No. 461,881.

*To all whom it may concern:*

Be it known that I, WILLIAM ARTHUR JAMES, a British subject, residing at 115 Rosebery Rd., Muswell Hill, London, England, have invented certain new and useful Improvements in Valve Mechanism for Internal-Combustion Engines, (for which I have filed application in England, Feb. 6, 1920, application No. 3684/20,) of which the following is a specification.

This invention relates to internal combustion engines of the kind wherein is employed one or more ports serving both for induction and exhaust, said ports having a bifurcated passage leading thereto.

According to the principal feature of the present invention the induction and exhaust branches of the bifurcated passage terminate in valve seatings that are inclined to each other at an acute angle, and the bifurcation is controlled by a flap valve oscillating between the said seatings.

The flap valve preferably rocks about an axis situated at or adjoining one element of its periphery and is actuated at a point situated at or adjoining the perpendicular axis passing through its center of gravity. The invention further consists in means for temporarily holding open the main valve to facilitate starting.

The invention further consists in detailed improvements in connection with the construction and actuation of the flap valve.

The invention is illustrated in the accompanying drawing in which Figure 1 represents a sectional elevation of a preferred construction and Fig. 2 a modification, Figs. 3, 4 and 5 showing details of Fig. 2. Figs. 6 and 7 are details.

Fig. 8 is a sectional view showing the mushroom valves and flap valve in plan corresponding with Fig. 2.

In the form illustrated in Fig. 1, a single port seated in the cylinder head and controlled by a mushroom valve 1 opens to a bifurcated passage of which the two branches 2, 3 lead to inlet and exhaust respectively. The branches terminate with valve seatings inclined to each other at an acute angle and serving as seatings for a flap valve 4 situated between said surfaces and adapted to close either branch alternately. The valve preferably comprises a circular disk having plane bearing surfaces, and is slotted at 5 to receive a bolt 6 to prevent displacement. The seating of the inlet and exhaust passages are extended in approaching directions to form plane bearing surfaces 7, 8, and the tail of the valve is curved as shown in Fig. 6 so that as it rocks in a plane parallel to the sectional plane about an axis situated at or adjoining an element of its periphery it executes also a rolling movement with regard to the said bearing surfaces.

In the construction illustrated in Fig. 1 where a single main valve is shown, the flap valve 4 is operated by a rod 9 having a spring controlled tappet head 10, the said rod being suitably actuated by a cam shaft 10′, and engaging with the rod at or adjoining the perpendicular axis passing through its center of gravity. The main valve 1 is operated from the same cam shaft through the intermediary of a rocker arm 11 traversing the sectional plane. The flap valve is dished as shown to form a spherical bearing and is mounted on its stem 12 by means of a spherical block 13 fitted over the reduced threaded end of the stem and held in place by a flanged spherical cap 14 screwed on to the stem 12 and locked by a steel cap 15. Approximately centrally of its actuation bearing-surfaces, the valve is holed so as to permit it to tilt about the stem during operation.

The spring controlled tappet-head 10 comprises a steel or other hard metal case 16 slidably mounted on a detachable cap 17 with the interposition of a spring 18, the case 16 being slotted as shown at 19 to engage slidably with a transverse pin 20 which traverses the inner cap 17 and is held in place by a resilient casing 21 firmly secured against a flange on the rod 9 when the cap 17 is screwed in place.

In the form shown, the flap valve is actuated toward the induction seating by a cam, and returned by a spring. The invention is not limited to this arrangement, but the valve may be operated toward the exhaust seating by a cam, or in both cases by cams.

The sparking plug is indicated at 22.

Referring now to the modification shown in Fig. 2, two main valves are here employed of which one only indicated by the numeral 23, is shown. The main valves and the flap valve 36 are operated by the overhead cam shaft 24, in the former case directly, and in the latter case through the intermediary of the rocker arm 25, shown separately in Figs. 4 and 5, which terminates in two circular shoulders 26 adapted to lift the valves on to the induction seating through the intermediary of a spring-controlled sliding collar 27, the interposed spring 28 being stronger than the controlling spring 29. The rocker arm 25 is pivoted on a shaft 30, and the actuation of the main valves is effected through the intermediary of circular shoulders 31 formed on interposed levers 32 Fig. 3, also pivoted on the same shaft, the object of the shoulders being to minimize the side strain on the valve stems. The said levers 32 carry extensions 33 which lie within a slotted tube 34 adapted to be rotated by the handle 35 (shown in dotted lines) so as to open the main valves to facilitate starting up; and the said handle may be automatically depressed and released on the actuation of the switch of an electric starting-set where such is installed. In the latter case, the handle may be spring-loaded so that on the first explosion, the valve 23 is closed by the motive fluid and the handle 35 and starting-switch returned to their inoperative positions.

In the present case, the flap valve 36 is again provided with curved bearing surfaces adapted to roll upon plane extensions of the valve seatings; but it is attached to its stem by means of a hollow pin, through holed integral ears.

The cycle is as follows:—At the moment of firing, the main valve is closed and the flap valve is seated so as to be closed to induction and open to exhaust.

The piston descends and toward the end of its stroke the main valve opens to allow the exhaust of the exploded mixture during the return piston stroke. At or about the completion of the return stroke, the flap valve is moved across the exhaust seating, and as the piston again descends a fresh charge is induced into the cylinder. At the completion of the induction stroke the main valve closes and remains closed during compression and firing; during which time, however, the flap valve moves over to the induction seating to complete the cycle of operations.

It will be seen that by this arrangement, I am enabled to provide considerably larger ports than is normally possible, and that the main valves are adapted to be cooled by the passage of the fresh charges which does not normally occur over the hot exhaust valves in ordinary constructions. To accentuate cooling, the upper surface of the flap valve may be provided with ribs or fins 4$^a$ over which the incoming charges pass as shown in Fig. 6. Normally the valve is circular and the seating extends around the major part of the periphery and across the chord thereof 4$^b$, the extension on the other side of the chord providing the rolling surfaces. It will be understood that instead of the engaging surfaces of the flap valves and seatings being plane, they may be conical. In this case the seatings for the flap valve will be beveled off as shown in the case of the seating for the mushroom valve in Fig. 1. It will be further understood that the arc of movement of the flap valve is sufficiently small to render the lateral movement between the said valve and its actuating means and rolling or bearing surfaces negligible.

I claim:—

1. In an internal combustion engine, a port serving both for induction and exhaust, a valve controlling said port, a bifurcated passage leading from said port, the bifurcated arms of said passage terminating in valve seatings that are inclined toward each other at an acute angle, and a flap valve oscillating between said seatings.

2. In an internal combustion engine, a port serving both for induction and exhaust, a valve controlling said port, a bifurcated passage leading from said port, the bifurcated arms of said passage terminating in valve seatings that are inclined toward each other at an acute angle, the said seatings having plane surfaces extending therefrom in approaching directions, and a flap valve oscillating between said seatings and rolling on said plane surfaces.

3. In an internal combustion engine, a port serving both for induction and exhaust, a valve controlling said port, a bifurcated passage leading from said port, the bifurcated arms of said passage terminating in valve seatings that are inclined toward each other at an acute angle, and a flap valve oscillating between said seatings about an axis situated at or adjoining an element of its periphery.

4. In an internal combustion engine, a port serving both for induction and exhaust, a valve controlling said port, a bifurcated passage leading from said port, the bifurcated arms of said passage terminating in valve seatings that are inclined toward each other at an acute angle, a flap valve oscillating between said seatings, and means for operating said valve, said means engaging the valve at a point situated at or adjoining its center of gravity.

5. In an internal combustion engine, a port serving both for induction and exhaust, a mushroom valve controlling said port, a bifurcated passage leading from said port, the bifurcated arms of said passage terminating in valve seatings that are inclined toward each other at an acute angle, and a flap valve oscillating between said seatings.

6. In an internal combustion engine, a port serving both for induction and exhaust, a mushroom valve controlling said port, a bifurcated passage leading from said port, the bifurcated arms of said passage terminating in valve seatings that are inclined toward each other at an acute angle, the said seatings having plane surfaces extending therefrom in approaching directions, a flap valve oscillating between said seatings, about an axis situated at or adjoining an element of its periphery and rolling on said plane surfaces.

7. In an internal combustion engine, a port serving both for induction and exhaust, a valve controlling said port, a bifurcated passage leading from said port, the bifurcated arms of said passage terminating in plane seatings that are inclined toward each other at an acute angle, the said seatings having plane surfaces extending therefrom in approaching directions, a flap valve having flat seating surfaces on each side thereof oscillating between said seatings and rolling on said plane surfaces.

8. In an internal combustion engine, a port serving both for induction and exhaust, a mushroom valve controlling said port, a bifurcated passage leading from said port, the bifurcated arms of said passage terminating in plane valve seatings that are inclined toward each other at an acute angle, the said seatings having plane surfaces extending therefrom in approaching directions, a flap valve having flat seating surfaces on each side thereof oscillating between said seatings, about an axis situated at or adjoining an element of its periphery and rolling on said plane surfaces.

9. In an internal combustion engine, a port serving both for induction and exhaust, a valve controlling said port, a bifurcated passage leading from said port, the bifurcated arms of said passage terminating in plane seatings that are inclined toward each other at an acute angle, the said seatings having plane surfaces extending therefrom in approaching directions, a flap valve having flat seating surfaces on each side thereof oscillating between said seatings rolling on said plane surfaces, the said valve being dished to form a spherical bearing, the dished portion being holed, a valve stem passing through said hole, and a spherical block and a spherical cap secured to said valve-stem to actuate said valve.

10. In an internal combustion engine, a port serving both for induction and exhaust, a mushroom valve controlling said port, a bifurcated passage leading from said port, the bifurcated arms of said passage terminating in valve seatings that are inclined toward each other at an acute angle, a flap valve oscillating between said seatings, a cam shaft and independent means for actuating each of said valves from said cam shaft.

11. In an internal combustion engine, a port serving both for induction and exhaust, a mushroom valve controlling said port, a bifurcated passage leading from said port, the bifurcated arms of said passage terminating in valve seatings that are inclined toward each other at an acute angle, a flap valve oscillating between said seatings, a tappet-rod, a spring-controlled tappet-head on said rod, actuating said flap valve, a rocker arm actuating said mushroom valve, and means for actuating said rocker arm and said tappet-rod.

12. In an internal combustion engine, a cylinder, a port serving both for induction and exhaust, a bifurcated passage leading to said port, the arms of said passage terminating in plane seating surfaces, plane bearing surfaces extending in approaching directions therefrom, a flap valve oscillating between said seatings, said valve having plane seating surfaces and an extension having curved surfaces adapted to roll on said bearing surfaces.

13. In an internal combustion engine, a cylinder, a port serving both for induction and exhaust, a bifurcated passage leading to said port, the arms of said passage terminating in plane seating surfaces, plane bearing surfaces extending in approaching directions therefrom, a flap valve oscillating between said seatings, said valve having plane seating surfaces, and an extension having curved surfaces adapted to roll on said bearing surfaces, a slot in said extension, and a transverse bolt extending between said bearing surfaces and engaged in said slot.

14. In an internal combustion engine, a cylinder, a port serving for both induction and exhaust, a bifurcated passage leading to said port, the arms of said passage terminating in plane seating surfaces, plane bearing surfaces extending in approaching directions therefrom, a flap valve oscillating between said seatings, said valve having double plane seating surfaces extending around a major portion of its periphery and across the chord thereof and curved bearing surfaces on the free side of said chord adapted to roll on the said extended bearing surfaces of the valve seatings.

15. In an internal combustion engine, a cylinder, a port serving both for induction and exhaust, a bifurcated passage leading to said port, the arms of said passage terminating in plane seating surfaces, plane bearing surfaces extending in approaching directions therefrom, a flap valve oscillating between said seatings, said valve having double plane seating surfaces extending around a major portion of its periphery and across the chord thereof and curved bearing surfaces on the free side of said chord adapted to roll on the said extended bearing surfaces of the valve seatings, one side of said valve being provided with cooling fins.

In testimony whereof I affix my signature.

W. A. JAMES.